(12) United States Patent
Min

(10) Patent No.: US 7,026,561 B2
(45) Date of Patent: Apr. 11, 2006

(54) REMOTE CONTROL BUTTON ASSEMBLY BUILT IN A STEERING WHEEL OF A VEHICLE

(75) Inventor: Jun Yong Min, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 78 days.

(21) Appl. No.: 10/751,040

(22) Filed: Dec. 31, 2003

(65) Prior Publication Data

US 2005/0077159 A1     Apr. 14, 2005

(30) Foreign Application Priority Data

Oct. 9, 2003   (KR) .................... 10-2003-0070336

(51) Int. Cl.
*H01H 9/00* (2006.01)
(52) U.S. Cl. .................................. 200/61.54
(58) Field of Classification Search .. 200/61.54–61.57; 280/731, 728.2; 74/473.12, 473.3
See application file for complete search history.

(56) References Cited

U.S. PATENT DOCUMENTS

| | | | | |
|---|---|---|---|---|
| 5,855,144 A | * | 1/1999 | Parada | 74/552 |
| 6,121,558 A | * | 9/2000 | Leng et al. | 200/61.27 |
| 6,525,283 B1 | * | 2/2003 | Leng | 200/339 |
| 6,548,772 B1 | * | 4/2003 | Liburdi | 200/61.54 |
| 6,796,202 B1 | * | 9/2004 | Takai et al. | 74/473.12 |

\* cited by examiner

*Primary Examiner*—Michael A. Friedhofer
(74) *Attorney, Agent, or Firm*—Morgan Lewis & Bockius LLP

(57) ABSTRACT

[A] remote control button assembly with a combined type button arrangement structure of a front button and a side button capable of effectively using a front surface engaging region and a lateral surface engaging region of a steering wheel. [Even] when the number of the buttons is increased, it is possible to achieve enough engaging area and sufficient button size for each button so that each button can function effectively and not be too small for the driver. Therefore, handling and operation ability of each button is enhanced. The remote control button assembly built into a steering wheel according to the present invention includes at least more than three front buttons provided on a front surface of a steering wheel, and at least one side button provided in a lower portion of a lateral surface of one side of the engaging region in which the front buttons are provided.

13 Claims, 2 Drawing Sheets

REMOTE CONTROL BUTTON ASSEMBLY BUILT IN A STEERING WHEEL OF A VEHICLE

CROSS-REFERENCE TO RELATED APPLICATIONS

This application claims priority of Korean Application No. 10-2003-0070336, filed Oct. 9, 2003, the disclosure of which is incorporated fully herein by reference.

FIELD OF THE INVENTION

The present invention relates to a remote control button assembly built into a steering wheel of a vehicle.

BACKGROUND OF THE INVENTION

With increasing requests for the convenience of vehicle operation, various apparatuses have been introduced in vehicles, in particular, in luxurious vehicles. For convenience, various kinds of operational switches are provided for operating easy-to-use devices such as an audio switch button, an indoor or outdoor mode switch button, and a navigation switch button on a steering wheel. However, there is a restriction for installing various convenient apparatuses due to limited space for installation on a vehicle steering wheel.

In addition, when a remote control switch button is incorporated into a steering wheel, various functions are required and thus necessitates increased numbers of switch buttons for remote control. However, considering that a basic engaging area is limited and also the buttons are arranged on the front surface of the steering wheel, the sizes of the buttons have decreased. This decreased button size results in difficulties in handling the buttons and also often leading to erroneous operations.

SUMMARY OF THE INVENTION

Embodiments of the present invention provide a remote control button assembly built into a steering wheel of a vehicle. The remote control button assembly ensures a sufficient button mounting space and at least predetermined minimum button dimensions in the steering wheel, even when the number of buttons is increased. This is accomplished by providing a combined type button arrangement structure consisting of a front button provided on a front surface of a steering wheel and a side button provided on a lateral surface of the same. Therefore, in the present invention, it is possible to enhance a handling and operating ability.

The remote control button assembly built in a steering wheel can include more than three front buttons arranged on a front surface of a steering wheel, with at least one side button installed at a lateral surface of an engaging region in which the front buttons are installed. The side button is provided with a contacting rod to operate a switch where the connecting rod is pivotally coupled to a bracket comprising a switch. Preferably, the width of the pressing portion of the side button is the same as the width of the pressing portion of the front button. Further, the number of the side buttons may be the same as the number of the front buttons.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
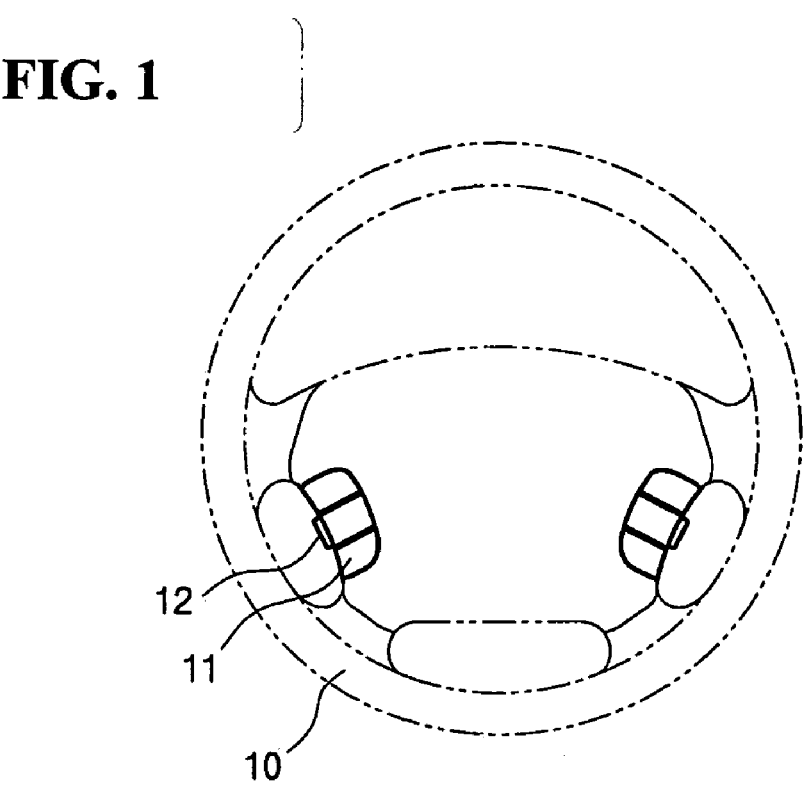
FIG. 1 is a front view illustrating an engaging state of a remote control button assembly built into a steering wheel according to the present invention.

FIG. 1 is a front view illustrating an engaging state of a remote control button assembly built in a steering wheel according to the present invention. As shown in FIG. 1, three front buttons 11 are arranged in series at a lower edge portion of steering wheel 10. One side button 12 is installed at a portion lower by a thickness of a button next to front button 11 based on an integral combination type.

In side button 12, the width of the pressing portion is the same size as the width of a pressing portion of front button 11. Therefore, it is possible to achieve the same feeling during the pressing operations of the front button and the side button. The number of the side buttons 12 may be the same as the number of the front buttons 11. For example, if there are provided three front buttons 11 on the front surface, three side buttons 12 may correspondingly be provided. Therefore, it is possible to install six buttons in one region using the front and lateral surfaces of steering wheel 10, and increasing the number of buttons installed does not require a the buttons to be reduced in size. Since it is possible to install a desired number of the buttons without downsizing the buttons, convenience in handling and operation can be ensured.

Figure 2:
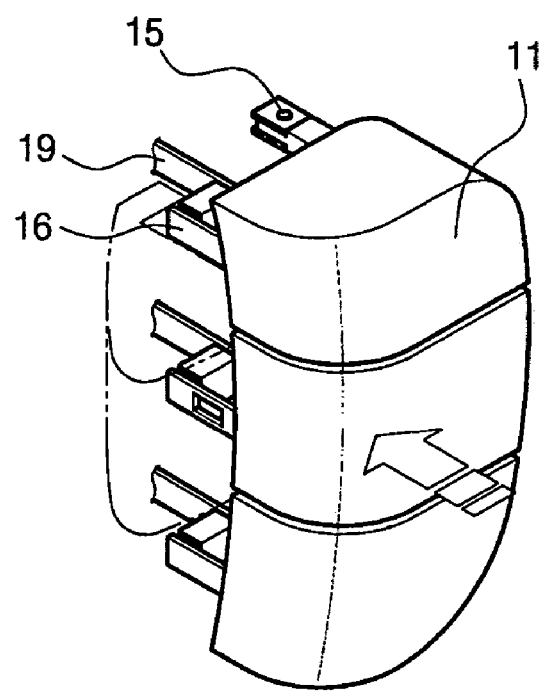
FIG. 2 is a perspective view illustrating the structure of a front button in a remote control button assembly built into a steering wheel according to the present invention.

FIG. 2 is a perspective view illustrating the construction of a front button in a remote control button assembly built in a steering wheel according to the present invention. As shown in FIG. 2, front button 11 is installed on a front surface of steering wheel 10. When front button 11 is pressed in the arrow's direction, front button 11 is rotated with respect to front button hinge point 15 of the inner surface, so that the switch operation is performed using front button 11 contacting rod 16 formed at the lower surface of front button 11. Here, front button hinge point 15 is formed by pin-coupling a connecting rod extending from the body of the button and a bracket. Front button hinge point 15 operates as a support point of the entire structure of the front button. Here, the reference numeral 18 represents a contacting point (switch) contacting with the contacting rod 16 and 14, and 19 represents a bracket equipped with a contacting point (switch).

Figure 3:
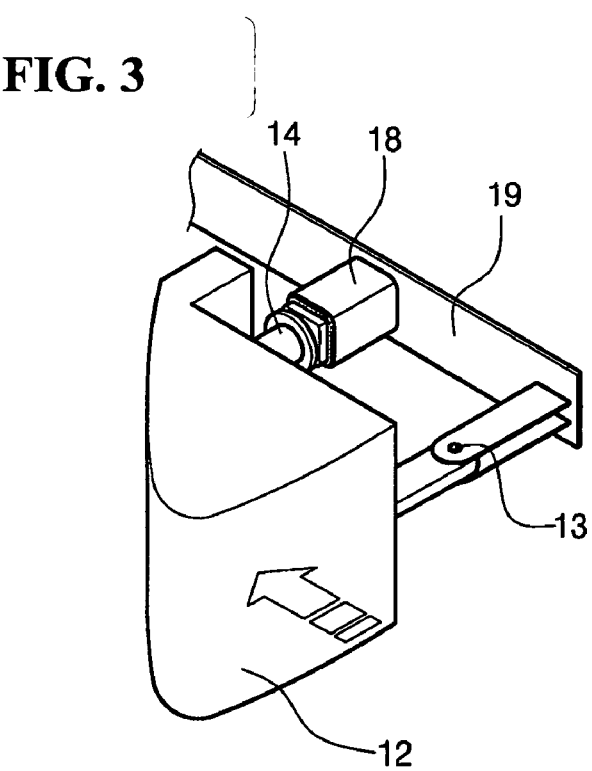
FIG. 3 is a perspective view of the construction of a remote control button assembly built in a steering wheel according to the present invention.

FIG. 3 is a perspective view illustrating the construction of a side button in a remote control button assembly built in a steering wheel according to the present invention. As shown in FIG. 3, a side button combined below front button 11 is installed at a lower portion with sufficient distance from the front button so as to prevent the side button from interfering the movement of the front button. The inner upper end of side button 12 is downwardly pressed with respect to the side button hinge point 13 in the arrow direction, so that the switch is performed using contacting rod 14 of the side button at the inner lower portion.

Figure 4:
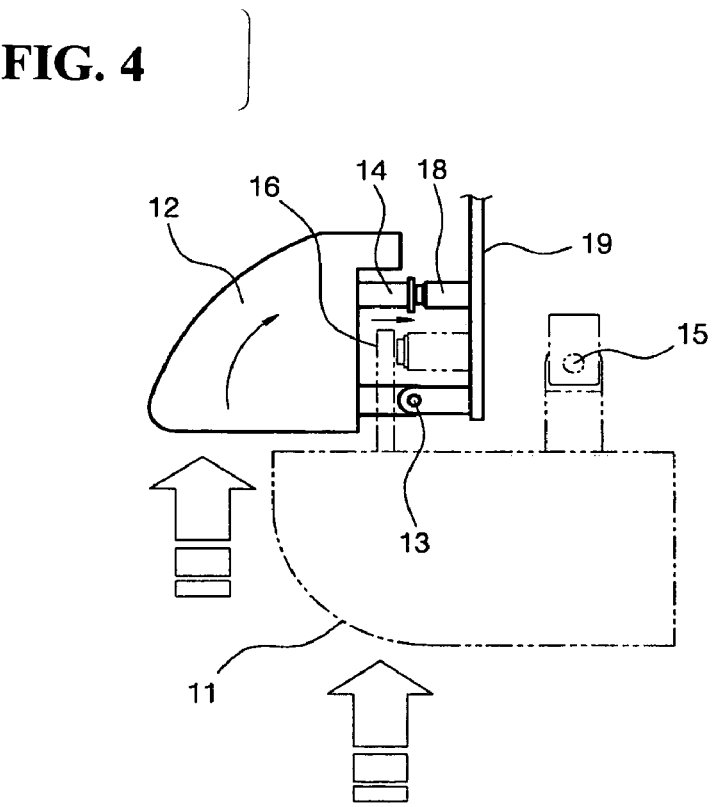
FIG. 4 is a plane view of the construction of a side button of a remote control button assembly built in a steering wheel according to the present invention.

FIG. 4 is a plane view of the construction of a side button in a remote control button assembly built in a steering wheel according to the present invention. In FIG. 4, there is shown front button 11 and side button 12. They are pressed in the downward direction from the front surface of the steering wheel 10 (i.e., in the direction of the arrow), thereby achieving the pressing operation. In the case of side button 12, the front side of the outwardly protruding portion is pressed. When each button is pressed in the direction of the arrow, the buttons are rotated with respect to the hinge position and are pressed downward. This results in each button contacting their respective corresponding contacting rod and thereby performing the switching operations.

As described above, the present invention provides a front surface and side surface combined type remote control button assembly built in a steering wheel including a front button provided on a front surface of a steering wheel and a side button provided in one side of the front button. Even when the number of buttons is increased based on the additions of functions, it is possible to achieve a sufficient area for button engaging and a button of sufficient size. Therefore, the handling and operation abilities of the button are improved, and the quality of the product is enhanced based on the increased convenience of use.

What is claimed is:

1. A remote control button assembly built in a steering wheel comprising:
   at least more than three front buttons arranged on a lower edge portion of a front surface of a steering wheel wherein said at least more than three front buttons further comprises a pressing portion aligned with said front surface of said steering wheel; and
   at least one side button provided in a lower portion of one lateral surface of an engaging region in which the front buttons are provided wherein said at least one side button further comprises a pressing portion aligned with said front surface of said steering wheel.

2. The remote control button assembly claim 1, wherein said at least one side button is provided with a contacting rod to operate a switch and a connecting rod pivotally coupled to a bracket comprising said switch, so that the side button pivotally rotates and the contacting rod operates said switch while moving downwardly.

3. The remote control button assembly in claim 2, wherein said pressing portion of said at least one side button has a width substantially equal to said pressing portion of said at least more than three front buttons.

4. The remote control button assembly in claim 1, wherein said pressing portion of at said least one side button has a width substantially equal to said pressing portion of said at least more than three front buttons.

5. The remote control button assembly in claim 1, wherein said at least one side button is a plurality of side buttons.

6. The remote control button assembly in claim 5, wherein said plurality of side buttons is equal in quantity to said at least more than three front buttons.

7. A remote control button assembly affixed to a steering wheel comprising:
   a plurality of front buttons having a pressing portion aligned with a front surface of said steering wheel;
   at least one side button substantially adjacent to said front buttons having a pressing portion aligned with said front surface of said steering wheel.

8. The remote control button assembly in claim 7, wherein said remote control button assembly is affixed to a lower edge portion of said front surface of said steering wheel.

9. The remote control button assembly in claim 7, wherein said side button further comprises:
   a switch affixed to a bracket;
   a contacting rod affixed to said side button wherein said side button is pivotally coupled to said bracket and wherein said contacting rod is configured to contact said switch.

10. The remote control button assembly in claim 9, wherein said pressing portion of at said least one side button has a width substantially equal to said pressing portion of said plurality of front buttons.

11. The remote control button assembly in claim 7, wherein said pressing portion of at said at least one side button has a width substantially equal to said pressing portion of said plurality of front buttons.

12. The remote control button assembly in claim 7, wherein said at least one side button is a plurality of side buttons.

13. The remote control button assembly in claim 12, wherein said plurality of side buttons is equal in quantity to said plurality of front buttons.

* * * * *